US005322729A

United States Patent [19]

Heeter et al.

[11] Patent Number: 5,322,729

[45] Date of Patent: Jun. 21, 1994

[54] METHOD AND APPARATUS FOR PRODUCING A BREATHABLE COATED FABRIC

[75] Inventors: David L. Heeter; Jeffrey L. Lawrentz, both of Coshocton, Ohio

[73] Assignee: Ansell Edmont Industrial Inc., Coshocton, Ohio

[21] Appl. No.: 680,386

[22] Filed: Apr. 4, 1991

[51] Int. Cl.[5] ........................ B05C 11/06; B05D 5/00; B32B 5/18

[52] U.S. Cl. ................................ 428/306.6; 427/243; 427/245; 427/246; 427/348; 428/254; 428/264; 428/265; 428/272; 428/290; 428/311.1; 428/315.5; 118/56

[58] Field of Search ............... 427/243, 245, 246, 348; 428/306.6, 311.1, 315.5, 264, 265, 254, 272, 290

[56] References Cited

U.S. PATENT DOCUMENTS

| | | | |
|---|---|---|---|
| 1,328,541 | 1/1920 | Palmer | 427/348 |
| 2,032,923 | 3/1936 | Eldridge . | |
| 2,717,841 | 9/1935 | Biefeld et al. | 427/243 |
| 3,514,313 | 5/1970 | Martel et al. . | |
| 3,520,765 | 7/1970 | Bateman et al. | 427/243 |
| 3,916,077 | 10/1975 | Damrau | 428/537 |
| 4,291,072 | 9/1981 | Barrett et al. | 427/243 |
| 4,336,279 | 6/1982 | Metzger | 427/55 |
| 4,472,461 | 9/1984 | Johnson | 427/208.6 |

*Primary Examiner*—James C. Cannon
*Attorney, Agent, or Firm*—Gardner, Carton & Douglas

[57] ABSTRACT

A method and apparatus for producing a breathable coated fabric is disclosed. The method involves coating a fabric substrate with a resin then opening pores in the resin by directing a flow of air through the fabric substrate and resin coating. The pores provide breathability of the coated fabric and allow for a vapor or moisture transmission rate about ten times that of a resin coated fabric without pores.

26 Claims, 2 Drawing Sheets

METHOD AND APPARATUS FOR PRODUCING A BREATHABLE COATED FABRIC

FIELD OF THE INVENTION

The present invention relates generally to the field of protective coated fabric production, and more particularly to the production of protective fabric which includes features of comfort and breathability.

BACKGROUND OF THE INVENTION

It is conventional in the fabric production industry to apply a resin or elastomeric latex coating to a fabric substrate to produce a fabric with a protective coating. The protective coating provides durability to the fabric and also protects the wearer against cuts or abrasions frequently encountered in a work environment. Such a coated fabric is typically sewn to form an article of clothing, such as a glove.

Prior art coated fabrics, however, suffer from the undesirable feature that they are not breathable. These prior art fabrics are produced with a continuous coating of a elastomeric latex or resin, thus resulting in a fabric which does not allow vapor or moisture transmission. As a result, perspiration which develops while the fabric is worn builds up on the user and cannot evaporate. Such a fabric is uncomfortable and may slip, cause overheating, or stick to the user.

Mechanical perforation of the coated fabric has been attempted in order to provide a degree of breathability. The macroscopic perforations produced by this mechanical process, however, provide breathability at the expense of sacrificing the desired physical protection properties of the coated fabric. The perforations are locations where the coated fabric may snag or be torn on sharp or unfinished surfaces, subjecting the wearer to the risk of injury from these hazardous objects. Perforations also reduce the strength of the coated fabric, making the fabric even more susceptible to tears or premature deterioration.

In another prior art product, a hybrid fabric is produced with one or more strips of an uncoated fabric substrate sewn together with a coated fabric. The coated fabric section provides protective features while the uncoated strip allows a degree of vapor and moisture transmission. Such a hybrid fabric is used in the prior art for the production of general purpose work gloves. The finger and palm portions of the gloves will have protective coating, a panel along the back of the hand will be uncoated and may consist of a lightweight nylon mesh. Although the uncoated nylon mesh strip provides some degree of breathability, large portions of the glove remain unbreathable, particularly in the finger sections where breathability is highly desirable. In a typical environment of use, it cannot be easily predicted where on the surface of the fabric the protective coating will, or will not, be required. Thus, either the protective qualities of the fabric are sacrificed to obtain better breathability, or the breathability features are sacrificed to provide an increased area of protection.

Another disadvantage of such a hybrid coated fabric is the additional production cost required to separately sew uncoated strip or panel. The uncoated strip requires an additional production step, results in increased labor costs, and complicates the fabric sewing process. Oftentimes, the production process of a hybrid fabric will not lend itself to automation, thus depriving the manufacturer of realizing the substantial financial rewards of producing fabric on a large-scale fully automated system.

SUMMARY OF THE INVENTION

It is an object of the present invention to provide a fabric with a protective coating which is breathable, allowing transmission of vapor and moisture through the fabric.

It is another object of the present invention to provide such a breathable protective coated fabric without sacrificing the protective properties of the fabric.

It is another object of the present invention to provide a breathable coated fabric which maintains its breathable properties throughout substantially the entire surface area of the coated fabric.

It is also an object of the present invention to provide such a breathable feature for a protective coated fabric by means of a plurality of microscopic pores in the protective coating of the fabric.

It is another object of the present invention to provide a method for producing a breathable protective coated fabric which may be practiced in a substantially automated manner.

It is also an object of the present invention to provide a method for producing a breathable protective coated fabric which may be easily implemented on a conventional fabric coating apparatus.

The above objects are realized in the present invention which provides a method for producing a breathable protective coated fabric which may be easily implemented on a conventional fabric coating apparatus. The method involves coating the top of a fabric substrate with a resin, such as an elastomeric latex. Before the coating is cured, an air knife, which is in direct contact with the bottom side of the fabric substrate, imparts a flow of air upwards and through the fabric web and the resin coat. As a result, a plurality of microscopic pores in the coating are opened before the fabric is processed to a final curing stage.

The pores produced by the method of the present invention are microscopic in size and therefore are substantially resistant to snagging on sharp objects or unfinished surfaces. Thus the protective qualities of the fabric are not compromised in order to provide the highly prized and desirable feature of breathability.

BRIEF DESCRIPTION OF THE DRAWINGS

Other objects and advantages of the invention will be apparent from the following detailed description and upon reference to the drawings, in which.

DETAILED DESCRIPTION OF THE INVENTION

Figure 1:
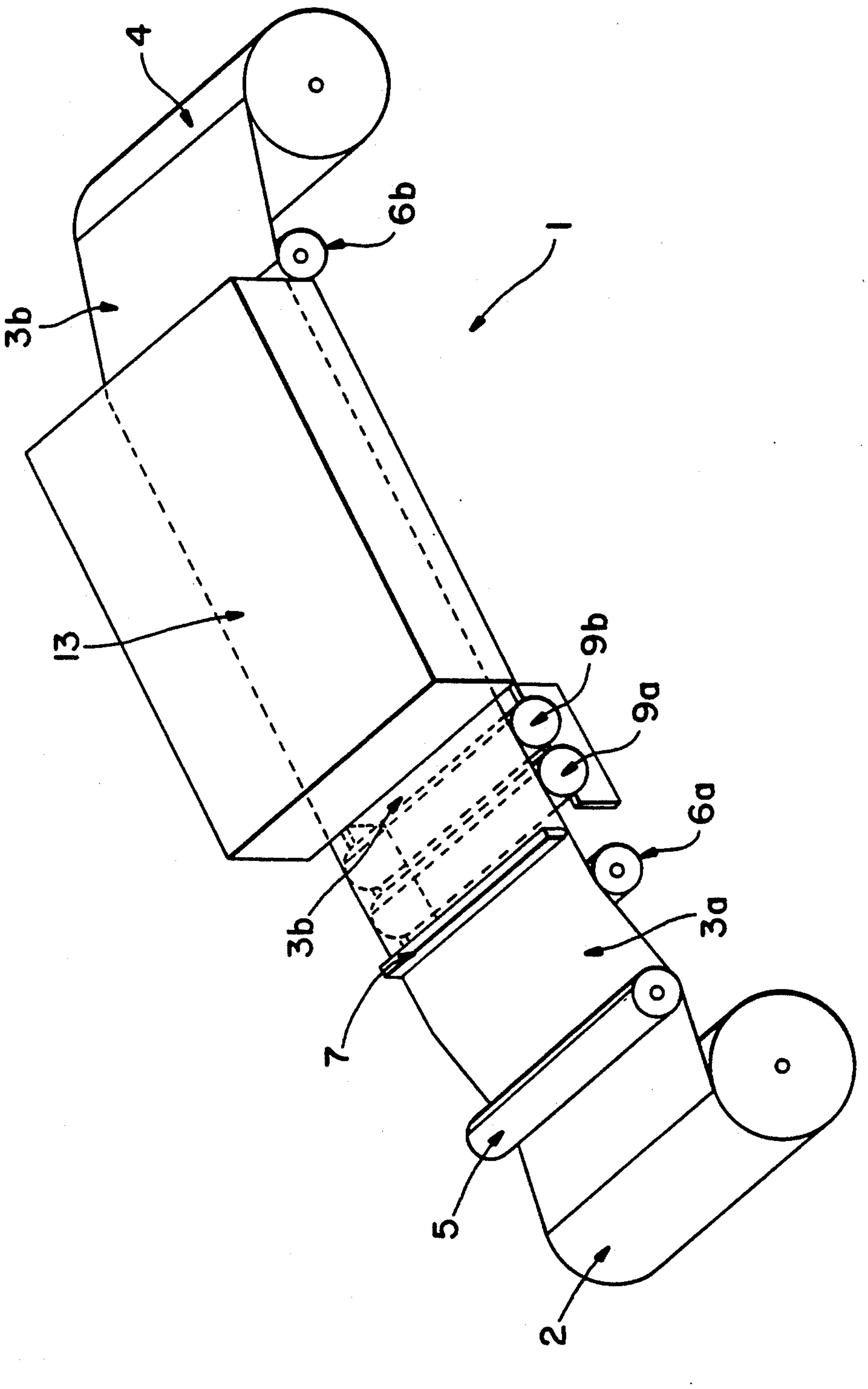
FIG. 1 is a perspective view of the fabric processing apparatus which carries out the method of the present invention.

While the present invention is susceptible to various modifications and alternative forms, certain preferred embodiments are shown by example in the drawings and will herein be described in detail. It should be understood, however, that disclosure of the invention by way of these examples is not intended to limit the invention to the particular forms disclosed, but on the contrary, the intention is to cover all modifications, equivalents, and alternatives falling within the spirit and scope of the invention as defined by the appended claims.

Turning to FIG. 1, there is shown a fabric processing apparatus 1 adapted to practice the method of the invention according to a preferred embodiment. The fabric processing apparatus 1 includes a supply roller 2 which provides a continuous roll of an uncoated fabric web, i.e., the fabric substrate 3*a*, to be processed by the apparatus 1 onto a breathable coated fabric take-off roller 4. A dancer bar 5 and a plurality of tension rollers 6*a* and 6*b* are used to maintain the fabric 3 in a smooth and taught manner throughout the process as well as guide the fabric 3 through the apparatus 1. As the fabric substrate 3*a* unrolls from the fabric supply roller 2 it moves at a generally uniform and constant rate through the various stages of the apparatus 1, until it is gathered on the fabric take-off roller 4 after it is processed into a breathable coated fabric with pores 3*c*.

In accordance with the preferred embodiment of the invention, the uncoated fabric 3*a*, also referred to as the fabric substrate or web, which is supplied to the fabric processing apparatus 1 by the fabric supply roller 2, may be comprised of a number of different materials. For example, the fabric substrate 3*a* may be either woven or non-woven, composed of natural or synthetic fibers, or a combination thereof. The width of the fabric substrate 3*a* may vary, however, the fabric is usually processed at a width which corresponds to industry standards. Although a wide variety of fabric substrates 3*a* may be used in accordance with the method of the present invention, it is preferable that the fabric substrate 3*a* be mesh or interlocked in nature such that a certain pore size is defined by the fabric substrate 3*a* itself.

Figures 2, 2A, 2B, 2C:
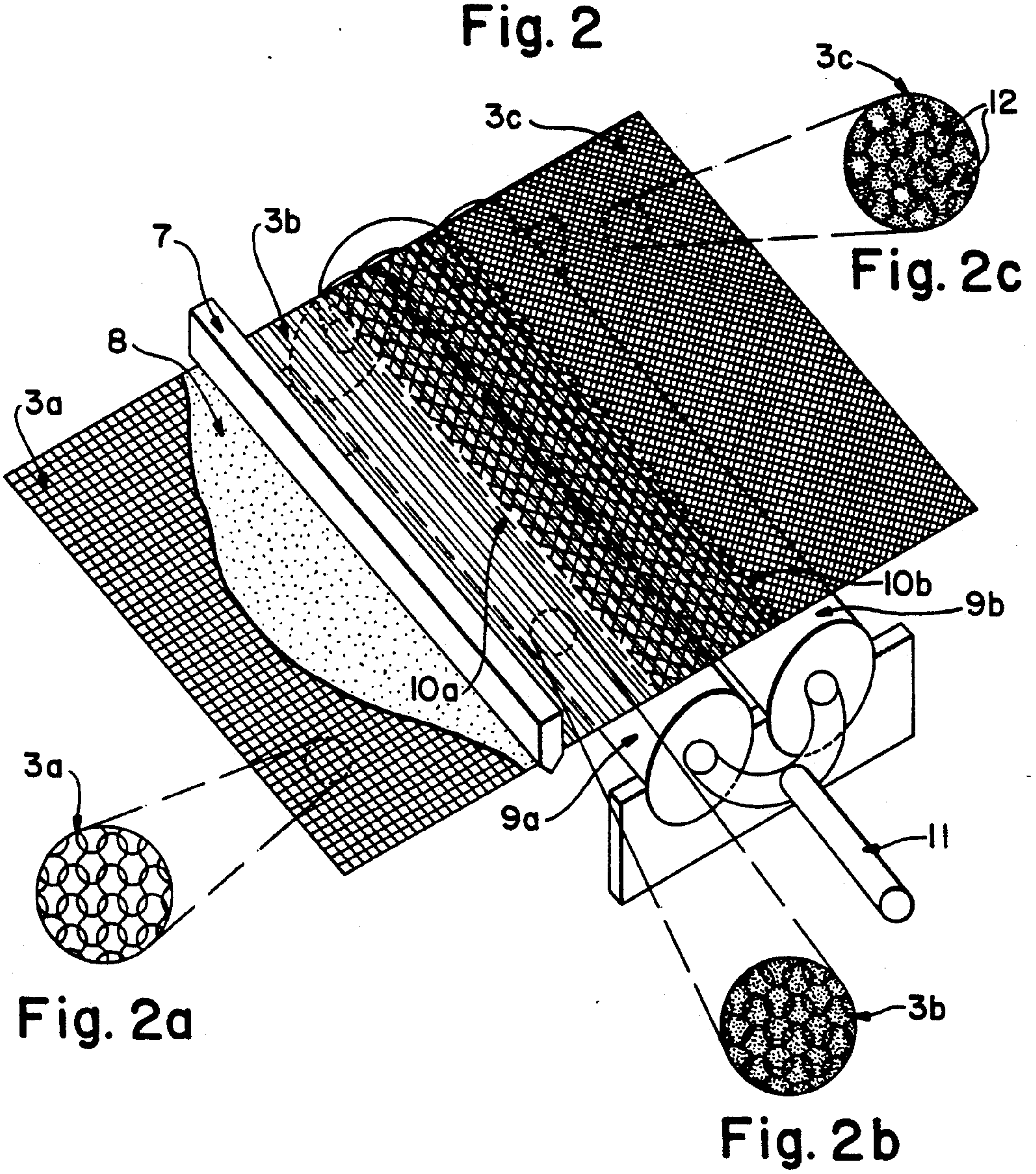
FIG. 2 is a perspective view of a portion of the apparatus of FIG. 1, depicting a section of the fabric in the vicinity of the coating knife and pair of air knives.
FIG. 2*a* is a magnified section of the uncoated fabric substrate of FIG. 2.
FIG. 2*b* is a magnified section of the coated fabric of FIG. 2, before pores are produced.
FIG. 2*c* is a magnified section of the coated fabric of FIG. 2, after pores are opened in the resin coating.

After the fabric substrate 3*a* is unrolled from the fabric supply roller 2 and moves along the processing path, a layer of resin 8 is applied to the surface of the fabric substrate 3*a*. The resin may be applied by a conventional coating knife 7, as depicted in FIG. 2. A wide variety of coating resins 8 may be used in accordance with the present invention, including natural rubber, butadiene-acrylonitrile, neoprene, polyurethane, polyvinyl chloride, styrene-butadiene, butyl and ethylene propylene.

According to a preferred embodiment of the present invention, the coating knife 7 applies a resin 8 of an elastomeric latex compound at a thickness of approximately 25 mils (0.025 inches) onto the fabric substrate. A preferred composition of the elastomeric latex used in the coating process (in units of parts per hundred of dry weight of elastomer) is as follows:

| MATERIAL | AMOUNT |
|---|---|
| Butadiene Acrylonitrile Latex | 100.00 |
| Stabilizer | 1.00 |
| Zinc Oxide | 5.00 |

According to this preferred composition, a stabilizer is used to inhibit the latex from flocculating, while the zinc oxide acts as a curing or cross-linking agent. The consistency of this preferred composition is substantially that of a liquid at room temperature, i.e., about 70°–75° F. Thus, the coating knife 7 applies the preferred elastomeric latex 8 at room temperature and in liquid form. Preferably, a thickener is used, such as a cellulose thickener, to maintain the coefficient of viscosity of the composition at approximately 60,000 centipoise.

It should be noted that the above disclosed resin composition is only a preferred composition and many other resin compositions may be used in accordance with the present invention. In addition to different compositions, the resin used may take different forms and may be applied in a different manner as well. For example, the resin may be foamed in order to provide additional comfort and bulk for an article of clothing produced from the breathable coated fabric.

After the fabric substrate 3*a* is coated by the coating knife 7, the coated fabric with pores 3*c* moves along to one or, Preferably, two air knives 9*a*, 9*b*. The air slots 10*a*,10*b* of the air knives 9*a*,9*b* are directed upward, preferably substantially perpendicular to the surface of the fabric, so as to produce a flow of air at and through a plurality of the pores of the fabric substrate 3*a* and the layer of resin 8. The force of the air flow impinging upon the bottom surface of the substrate 3*a* opens pores in the resin coating 8.

The air knife 9*a* is preferably maintained in direct contact with the bottom side of the coated fabric 3*b*, so as to optimize the effect of opening pores 12 in the resin 8. If the air knife 9*a* were positioned other than in direct contact with the fabric substrate 3*a*, a substantial part of the air flow would be deflected along the bottom surface of the substrate 3*a*, rather than flowing through the substrate 3*a* to force open pores 12 in the resin 8.

According to the preferred embodiment of the present invention, the air knife 9*a* is supplied with a source of pressurized air. As depicted, this source of pressurized air is supplied through an air supply manifold 11. One embodiment of the present invention maintains the air supply pressure at approximately 15 p.s.i. at a temperature of approximately 200° F. The flow of air produced by the air knife 9*a* (or knives 9*a*, 9*b*) opens a plurality of pores 12 in the resin coating 8 of the coated fabric substrate. The pores 12, which are microscopic holes opened by the air flow produced by the air knife, remain open throughout the entire process and provide the breathability feature of the resulting fabric.

It is preferred that the air knife project a flow of hot air through the fabric. If the air is hot, the resin coating 8 in the proximity of the pores 12 temporarily sets, ensuring that the freshly opened pores remain open as the coated fabric with pores 3*c* is processed through the final curing and drying stages. If hot air is used, it is likely that the processing rate of the fabric may be increased while ensuring that the pores 12 in the resin coating 8 remain open as the coated fabric with pores 3*c* is cured in the oven 13. A hot air flow will have the tendency to set the pores 12, at least temporarily, until the coated fabric with pores 3*c* reaches the cure oven where the resin coat 8 with open pores 12 will be permanently set. In order to enhance the ability of a hot air flow to set the freshly opened pores 12, a gelling or heat sensitive agent may be added to the resin 8 before it is applied to the fabric substrate 3*a*. Addition of such an agent will increase the sensitivity of the resin 8 to heat, which will cause the resin 8 in the proximity of the opened pores 12 to set more permanently upon contact with a flow of hot air.

After the coated fabric has moved past the air knives 9*a*, 9*b* a plurality of microscopic pores 12 have been opened in the resin coating 8. Since the air slots 10*a*,10*b* of the air knives 9*a*,9*b* preferably extend across the full width of the fabric, the pores 12 are substantially uniformly spaced throughout the entire area of the fabric. Thus, the breathable qualities of the fabric provided by the pores 12 will be realized even if only portions of the resulting fabric are used to produce an article of clothing. For example, if the breathable coated fabric is cut and sewn into a general purpose work glove, the highly desirable breathable features of the fabric will be present in all areas of the gloves, including the finger and palm sections as well.

According to a preferred embodiment of the invention, two air knives 9*a*,9*b* are used to open pores 12 in the resin coat 8. Using two air knives, rather than one air knife, allows the fabric to be processed at a higher rate. The first air knife 9*a* opens a number of pores 12 in the resin coat 8, as well as "loosening" the resin coat in a number of other areas. The second air knife 9*b* then opens many of these loosened areas, resulting in additional opened pores 12. Both air knives 9*a*,9*b* function to temporarily set the resin 8 in the proximity of the open pores 12 until the time when the pores are permanently set in the cure oven 13 at the final curing stage.

This preferred embodiment of the invention which utilizes two air knives, when used to process an interlocked knit material composed of 38/1 cotton polyester blend yarn with an interstitial dimension of about 6 to 10 mils, will produce a final breathable coated fabric with a pore density of about 200 to 300 pores/inch$^2$. The breathability of the coated fabric is related to the pore density. Differences in the fabric substrate and the resin coating may also affect the breathability of the coated fabric. For example, a substrate with a greater interstitial dimension will likely produce a fabric with larger pores and greater breathability.

If only one air knife is used, a relatively fewer number of pores will be opened in the resin coat. Thus, the second air knife allows additional pores to be opened. A greater number of pores could be open using one air knife if the processing rate of the fabric is reduced. This will result in a longer period with which the air knife air flow will impact any particular section of the fabric. If the pore density is increased, the breathability of the coated fabric is also increased.

It is preferable to maintain a relatively high processing rate so as to result in a high production rate. According to a preferred embodiment of the invention which uses two air knives and hot air, the processing rate of the fabric can be maintained at a rate of about 1 foot per minute. Higher processing rates may be achieved, while still maintaining about the same degree of breathability, by using additional air knives.

The diameter of the pores in the resin coat of the breathable coated fabric 3*c* typically corresponds to, and is slightly less than the interstices of the threads of the fabric substrate 3*a*. Since the resin 8 has a tendency to adhere to the threads of the fabric substrate 3*a* which define the pores 12 in the breathable coated fabric 3*c*, the resulting pore size is typically slightly smaller than the interstices of the threads of the substrate 3*a*. According to a preferred embodiment of the invention as depicted in FIG. 2*a*, the fabric substrate 3*a* is an interlocked knit material composed of 38/1 cotton/polyester blend yarn, which typically has a fabric weight of approximately 4.8 ounces per square yard. The interstices of the threads of this preferred fabric substrate range from approximately 6 to 10 mils. Thus, as can be seen in FIG. 2*c*, the pore size of the breathable coated fabric 3*c* produced will correspondingly be slightly smaller than 6 to 10 mils.

As shown in FIG. 2*a*, a preferred fabric substrate material 3*a* is an interlocked knit material composed of a cotton/polyester blend yarn. After the substrate 3*a* has been coated by a layer of resin 8, as shown in FIG. 2*b*, a continuous coat of resin 8 adheres to the substrate 3*a* producing a fabric 3*b* with a continuous coat of resin 8. Since this coated fabric 3*b* has a continuous and uninterrupted coating of resin 8, the coated fabric 3*b* does not allow the transmission of vapor or moisture. After the coated fabric 3*b* passes over the air knives 9*a*,9*b*, a plurality of microscopic pores 12 are opened in the resin coat, as shown in FIG. 2*c*. The diameter of the pores 12 correspond to, and is slightly less than the interstitial dimension of the fabric substrate threads. The pores 12 allow for transmission of vapor and moisture through the coated fabric, thereby making the coated fabric with pores 3*c* breathable.

After the pores 12 in the resin coating 8 are open and set by the air knives 9*a*,9*b*, the coated fabric with pores 3*c* enters a cure oven 13, the final stage of processing. The cure oven 13 may be of a conventional circulating air variety. According to an embodiment of the invention, the cure oven 13 will dry and cure the coated fabric by preferably maintaining a temperature of about 300° F. for a period of about 10 minutes. After this final stage, the pores 12 in the resin 8 of the coated fabric with pores 3*c*, as well as the resin coating itself, are permanently set.

The resulting fabric from the process of the present invention may subsequently be cut and sewn into an article of clothing. For example, a glove may be produced which, due to the breathable nature of the coated fabric produced by the process, will exhibit the highly prized and desirable breathability feature. The wearer of such gloves will notice the comfort of the fabric of the gloves which, when produced in accordance with process of the present invention, provide vapor or moisture transmission rates on the order of approximately 10 times greater than prior art coated gloves.

As is apparent from the foregoing description, the present invention provides a method and apparatus for producing a breathable coated fabric. The breathable coated fabric is produced by applying a resin coating to a fabric substrate, then opening a plurality of microscopic pores in the resin coat with a flow of air. The pores provide breathability of the coated fabric and allow for a vapor or moisture transmission rate which is about ten times that of a resin coated fabric without pores. Since the pores are microscopic, the coated fabric remains substantially resistant to snags or tears from sharp objects or unfinished surfaces. Likewise, the microscopic pores allow the integrity and strength of the fabric to be maintained. Thus, the breathability features of the invention are provided without compromising the protective qualities of the coated fabric.

What is claimed is:

1. A process for producing a breathable coated fabric, said process comprised of the steps of:

applying a coat of resin to a fabric substrate, forcing a flow of air through said resin coated fabric thereby opening a plurality of pores in said resin coat, processing to a final form said resin coated fabric with a plurality of pores in said resin coat.

2. The process of claim 1 wherein said flow of air is hot and sets, at least temporarily, said plurality of pores in said resin coat.

3. The process of claim 1 wherein said pores in said resin coat are microscopic in size.

4. The process of claim 1 wherein said resin is an elastomeric latex.

5. The process of claim 1 wherein said flow of air is provided by one or more air knives.

6. The process of claim 1 wherein said fabric substrate is maintained in a substantially horizontal position while said resin coat is applied to the top surface of said fabric and said flow of air is directed through the bottom surface of said fabric substrate.

7. The process of claim 6 wherein said flow of air is provided by one or more air knives which are substantially in direct contact with the bottom surface of said fabric substrate.

8. The process of claim 1 wherein said resin is selected from the group consisting of natural rubber, butadiene-acrylonitrile, neoprene, polyurethane, polyvinyl chloride, styrene-butadiene, butyl, ethylene propylene and compositions thereof.

9. The process of claim 1 wherein said fabric substrate is comprised of fibers which are woven, non-woven, or knitted, or a combination thereof.

10. The process of claim 1 wherein the fibers of said fabric substrate are natural or synthetic, or a combination thereof.

11. The process of claim 1 wherein the material of said fabric substrate is an interlocked knit material of cotton and polyester blend yarn.

12. The process of claim 1 including the step of foaming said resin before said applying step.

13. The process of claim 1 including the step of adding a gelling or heat sensitive agent to said resin before said applying step.

14. A breathable coated fabric produced by the steps of:

applying a coat of resin to a fabric substrate, forcing a flow of air through said resin coated fabric thereby opening a plurality of pores in said resin coat, processing to a final form said resin coated fabric with a plurality of pores in said resin coat.

15. The process of claim 14 wherein said flow of air is hot and sets, at least temporarily, said plurality of pores in said resin coat.

16. The breathable coated fabric of claim 14 wherein said pores in said resin coat are microscopic in size.

17. The breathable coated fabric of claim 14 wherein said resin is an elastomeric latex.

18. The breathable coated fabric of claim 14 wherein said flow of air is provided by one or more air knives.

19. The breathable coated fabric of claim 14 wherein said fabric substrate is maintained in a substantially horizontal position while said resin coat is applied to the top surface of said fabric substrate and said flow of air is directed through the bottom surface of said fabric substrate.

20. The breathable coated fabric of claim 19 wherein said flow of air is provided by one or more air knives which are substantially in direct contact with the bottom surface of said fabric substrate.

21. The breathable coated fabric of claim 14 wherein said resin is selected from the group consisting of natural rubber, butadiene-acrylonitrile, neoprene, polyurethane, polyvinyl chloride, styrene-butadiene, butyl, ethylene propylene and compositions thereof.

22. The breathable coated fabric of claim 14 wherein said fabric substrate is comprised of fibers which are woven, non-woven or knitted, or a combination thereof.

23. The breathable coated fabric of claim 14 wherein the fibers of said fabric substrate are natural or synthetic, or a combination thereof.

24. The breathable coated fabric of claim 14 wherein the material of said fabric substrate is an interlocked knit material of cotton and polyester blend yarn.

25. The breathable coated fabric of claim 14 wherein said resin is foamed before applying to said fabric substrate.

26. The breathable coated fabric of claim 14 wherein a gelling or heat sensitive agent is added to said resin before said resin is applied to said fabric substrate.

* * * * *